3,482,025
GLUTATHIONE-AMINO ACID COMPOSITIONS, AND GLUTATHIONE-BASIC AMINO ACID SALTS

Masuo Murakami, Yuji Kawashima, and Kengi Sano, Tokyo, Japan, assignors to Yamanouchi Pharmaceutical Co., Ltd., Tokyo, Japan
No Drawing. Filed Aug. 30, 1965, Ser. No. 483,861
Claims priority, application Japan, Sept. 28, 1964, 39/54,553; Dec. 7, 1964, 39/68,493; Jan. 21, 1965, 40/2,796
Int. Cl. A61k 27/00; C07c 151/00
U.S. Cl. 424—319         17 Claims

ABSTRACT OF THE DISCLOSURE

Compositions of glutathione and at least one amino acid result in a higher blood level of reduced form glutathione even upon oral administration. Said compositions are useful, e.g., in the therapy of liver diseases.

---

The present invention relates to compositions which consist essentially of glutathione and one or more amino acids, in the form of the free amino acids(s) or in the form of the salts thereof, and to compositions which consist essentially of salt of glutathione and basic amino acid. More particularly, the invention is concerned with compositions consisting of glutathione and one or more amino acids selected from among the basic amino acids, tryptophane, citrulline, and ω-amino acids having 3 to 7 carbon atoms in the molecule, the said amino acids being in the free of salt form. In the case of the basic amino acids, they can form salts with the gluthathione.

The gluthathione in this invention can be either in the reduced form or in the oxidized form.

It is known that reduced form glutathione, when administered parenterally, is effective for activating the liver fuctions of the human body and of animals (cf. Arzneimittel Forschung, 14(10), 1157–9 [1964]) and is very effective for protecting from radiation hazards (cf. Proc. Soc. Exp. Biol. Med., 75, 318–322 [1950]). Further, it is thought that glutathione is effective in stimulating the growth of domestic animals, such as cattle and poultry, etc.

The present invention is based on the observation that increase in the blood level of reduced form glutathione in the mesenteric vein is very low when the glutathione is administered orally, so that the above-mentioned effects realized on parenteral administration cannot be expected in the case of oral administration.

It is accordingly a primary object of the present invention to embody glutathione-amino acid compositions and glutathione-basic amino acid salts which give a high increase in blood level of reduced form glutathione, even when orally administered.

Other objects of the invention will be clear from the following.

According to the present invention, the blood level of reduced form glutathione can be markedly increased by compounding therewith one or more amino acids selected from among the basic amino acids, tryptophane, citrulline, and ω-amino acids having 3 to 7 carbon atoms in the molecule. As aforesaid, in the case of the basic amino acids, the new composition can take the form of the glutathione-basic amino acid salt.

Any basic amino acid and any ω-amino acid having 3 to 7 carbon atoms in the molecule can be used in the present invention if they are innoxious, and these amino acids as well as the tryptophane and citrulline can be in either the L form or the DL form, but L type amino acids are preferred for the purposes of this invention.

The ratio of glutathione to the amino acid or amino acids in the compositions of this invention can vary widely, particularly in the range from 1:0.4 to 1:10 by weight ratio, but the amino acid or amino acids are preferably used in a stoichiometric quantity or in slight excess of such quantity relative to the glutathione. In the case of the glutathione-basic amino acid salts, the two components are preferably used in stoichiometric amounts.

The compositions of the invention are advantageously prepared by grinding a mixture of glutathione and the amino acid or amino acids in the dry state, and the glutathione-basic amino acid salts are prepared by mixing glutathione and the basic amino acid or amino acids in water, an aqueous solvent or other suitable solvent, and isolating the thus-formed salt.

The thus-obtained glutathione-amino acid compositions or glutathione-basic amino acid salts of this invention are able remarkably to increase the blood level of reduced form glutathione, even upon oral administration, in comparison with the blood level achieved with the use of glutathione alone.

Table 1, which follows, summarizes results obtained in tests run to clarify the effects of the compositions and salts of this invention, in comparison with reduced form glutathione (Gl.) alone, oxidized form Gl. alone, and a mixture of only the amino acid components of Gl., i.e. glycine, cysteine and glutamic acid. Each test sample was dissolved in an aqueous 0.7% (by weight) sodium chloride solution to give a concentration of 0.06 mol of the sample per liter of solution, the last sample of the table containing equivalent of the components (glycine, cysteine and glutamic acid) to give the solution containing 0.06 mol of each of the said components in the solution per liter of solution. 25 milliliters of thus-prepared solution was, in each case, injected into the lumen of the ligated part of rabbit intestines, and the glutathione level ($\gamma$/milliter) of the plasma collected from the mesenteric vein was measured every 30 minutes by the glyoxalase method (cf. "Method of Biochemical Analysis," 2, 270 [1955]).

TABLE 1

| Sample | Time (minutes) | | | |
|---|---|---|---|---|
|  | 0 | 30 | 60 | 90 |
| Reduced form glutathione alone | 7.9 | 21.0 | 14.6 | 18.8 |
| Oxidized form Gl. alone | 3.7 | 17.9 | 11.9 | 9.9 |
| Reduced form Gl.+Ornithine hydrochloride (cf. Example 1) | 1.9 | 37.1 | 56.0 | 41.7 |
| Oxidized form Gl.-mono-ornithine salt (cf. Example 14) | 6.8 | 67.1 | 65.8 | 56.4 |
| Reduced form Gl.+Tryptophane (cf. Example 3) | 1.4 | 60.2 | 65.1 | 50.7 |
| Reduced form Gl.-lysine salt (cf. Example 12) | 5.2 | 9.9 | 31.9 | 38.4 |
| Reduced form Gl.-orinithine salt (cf. Example 13) | 8.1 | 62.1 | 68.5 | 62.1 |
| Mixture of amino acid components of Gl. | 2.9 | 0 | 7.9 | 3.1 |

(As the solvent for the samples, an aqueous 0.7% sodium chloride solution was used, and the pH of the solution was in each case adjusted to 7.4 with sodium bicarbonate.)

The foregoing results confirm that the absorption of glutathione is enhanced in those cases where use is made of the compositions and of the salts according to the present invention, and that the high blood level of reduced form glutathione is maintained for a longer period of time than when use is made of glutathione alone.

The glutathione-amino acid compositions and glutathione-basic amino acid salts of the present invention are exemplified in the following illustrative examples, to which the invention is however not intended to be limited. In these examples, "g." stands for grams and "ml." stands for milliliters.

EXAMPLE 1

A mixture of 10 g. of reduced form glutathione and 5.4 g. of ornithine monohydrochloride was ground thoroughly into fine powder.

EXAMPLE 2

A mixture of 10 g. of reduced form glutathione and 5.9 g. of lysine monohydrochloride was ground thoroughly into fine powder.

EXAMPLE 3

A mixture of 10 g. of reduced form glutathione and 6.6 g. of L-tryptophane was ground thoroughly into fine powder.

EXAMPLE 4

A mixture of 10 g. of reduced form glutathione and 5.7 g. of DL-citrulline was ground thoroughly into fine powder.

EXAMPLE 5

A mixture of 10 g. of reduced form glutathione and 4.3 g. of ε-aminocaproic acid was ground thoroughly into fine powder.

EXAMPLE 6

A mixture of 10 g. of reduced form glutathione, 3.3 g. of L-tryptophane and 2.9 g. of DL-citrulline was ground thoroughly into fine powder.

EXAMPLE 7

A mixture of 10 g. of oxidized form glutathione and 13.2 g. of L-tryptophane was ground thoroughly into fine powder.

EXAMPLE 8

A mixture of 10 g. of oxidized form glutathione and 11.4 g. of DL-citrulline was ground thoroughly into fine powder.

EXAMPLE 9

A mixture of 10 g. of oxidized form glutathione and and 11.8 g. of L-lysine monohydrochloride was ground thoroughly into fine powder.

EXAMPLE 10

A mixture of 10 g. of oxidized form glutathione and 8.4 g. of ε-aminocaproic acid was ground thoroughly into fine powder.

EXAMPLE 11

A mixture of 10 g. of oxidized form glutathione, 6.8 g. of L-tryptophane and 6.0 g. of DL-citrulline was ground thoroughly into fine powder.

EXAMPLE 12

3.07 g. of reduced form glutathione was dissolved in 9.4 ml. of an aqueous solution of 1.46 g. of free L-lysine, and the resultant solution was concentrated under reduced pressure and at a temperature below 40° C. By adding to the concentrated solution the three-fold quantity of ethanol, a white precipitate was deposited, which was filtered and recrystallized from water-ethanol to give 4.0 g. of reduced form glutathione-L-lysine salt having a melting point of 190–193° C. (decomposition).

$[\alpha]_D^{23} = -1.14$ (c.=2.10, $H_2O$)

Elementary analysis: (as $C_{15}H_{31}N_5O_8S$)

| | C | H | N |
|---|---|---|---|
| Calculated, percent | 42.37 | 6.89 | 15.44 |
| Found, percent | 41.89 | 6.85 | 15.31 |

EXAMPLE 13

3.07 g. of reduced form glutathione was dissolved in 11.21 ml. of an aqueous solution of 1.32 g. of free L-ornithine, and the resultant solution was treated after the manner described in Example 12 to give 3.9 g. of colorless fine acicular crystals (recrystallized from water-ethanol) of reduced form glutathione-L-ornithine salt having a melting point of 214–215° C. (decomposition).

$[\alpha]_D^{23} = -11.7°$ (c.=2, $H_2O$)

Elementary analysis: (as $C_{15}H_{29}N_5O_8S$)

| | C | H | N | S |
|---|---|---|---|---|
| Calculated, percent | 40.99 | 6.65 | 15.94 | 7.30 |
| Found, percent | 40.86 | 6.75 | 15.83 | 7.34 |

EXAMPLE 14

6.12 g. of oxidized form glutathione was dissolved in 25 ml. of an aqueous solution of 1.32 g. of free L-ornithine, and the resultant solution was treated after the manner described in Example 12 to give 7 g. of oxidized form glutathione-mono-L-ornithine salt having a melting point of 160–180° C. (decomposition).

$[\alpha]_D^{23} = -75.8$ (c.=1.0, $H_2O$)

EXAMPLE 15

6.12 g. of oxidized form glutathione was dissolved in 16.5 ml. of an aqueous solution of 2.64 g. of free L-ornithine, and the resultant solution was treated after the manner described in Example 12 to give 8.3 g. of oxidized form glutathione-di-L-ornithine salt having a melting point of 205–210° C. (decomposition).

$[\alpha]_D^{23} = -68.4$ (c.=1.0, $H_2O$)

The compositions, i.e. glutathione-amino acid compositions and glutathione-basic amino acid salts of the present invention are useful in the therapy of liver diseases (acute and chronic hepatitis, liver cirrhosis, etc.), radiation hazards and diabetes as well as of acute and chronic eczema, drug eruption, toxicoderma and wheal more effectively than the glutathione itself even on oral administration.

The new compositions are advantageously administered orally, e.g. in tablet form the tablet being made up in conventional manner with conventional tabletting excipients, although the new salts can, by virtue of their water solubility, be administered parenterally. Usual dosages range from about 1 milligram to about 20 millgrams per kilogram of body weight per day.

What is claimed is:
1. A composition consisting of a glutathione selected from the group consisting of reduced form glutathione and oxidized form glutathione and at least one amino acid selected from the group consisting of basic amino acids, tryptophane, citrulline, and ω-amino acids having 3 to 7 carbon atoms in the molecule, the weight ratio of glutathione to amino acid being in the range of from 1:0.4 to 1:10.
2. A composition according to claim 1, wherein the glutathione is reduced form glutathione and the amino acid is ornithine monohydrochloride.
3. A composition according to claim 1, wherein the glutathione is reduced form glutathione and the amino acid is lysine monohydrochloride.
4. A composition according to claim 1, wherein the glutathione is reduced form glutathione and the amino acid is L-tryptophane.
5. A composition according to claim 1, wherein the glutathione is reduced form glutathione and the amino acid is DL-citrulline.
6. A composition according to claim 1, wherein the glutathione is reduced form glutathione and the amino acid is ε-aminocaproic acid.
7. A composition according to claim 1, wherein the glutathione is reduced form glutathione and the amino acids are L-tryptophane and DL-citrulline.
8. A composition according to claim 1, wherein the glutathione is oxidized form glutathione and the amino acid is L-tryptophane.
9. A composition according to claim 1, wherein the glutathione is oxidized form glutathione and the amino acid is DL-citrulline.

10. A composition according to claim 1, wherein the glutathione is oxidized form glutathione and the amino acid is L-lysine monohydrochloride.

11. A composition according to claim 1, wherein the glutathione is oxidized form glutathione and the amino acid is ε-aminocaproic acid.

12. A composition according to claim 1, wherein the glutathione is oxidized form glutathione and the amino acids are L-tryptophane and DL-citrulline.

13. A salt of glutathione and at least one basic amino acid, the salt being selected from the group consisting of a 1:1 salt of glutathione in reduced form, a 1:1 salt of glutathione in oxidized form and a 1:2 salt of glutathione in oxidized form, the ratios 1:1 and 1:2 being molar ratios.

14. A salt according to claim 13, wherein the glutathione is reduced form glutathione and the basic amino acid is L-lysine.

15. A salt according to claim 13, wherein the glutathione is reduced form glutathione and the basic amino acid L-ornithine.

16. A salt according to claim 13, wherein the glutathione is oxidized form glutathione and the basic amino acid is L-lysine.

17. A salt according to claim 13 wherein the amino acid is L-ornithine.

References Cited

Chemical Absts. 56; 2859–2860.

Brunschwig, A., et al. Carbon Tetrachloride Injury of the Liver, Vol. 60 (1945), pp. 388–391.

Najarian J. S., et al. Etelogy & Treatment of Ammonia Intoxication Ass. with Disease of the Liver, Surgery, Gynecology & Obs. V. 106 (1958), pp. 577–585.

Borsook H., et al., The Conversion of Citrulline To Arginine in Kidney, J. Biol. Chem. V. 141 (1941), pp. 717–732.

FRANK CACCIAPAGLIA, Jr., Primary Examiner

U.S. Cl. X.R.

260—501.11